(12) United States Patent
Sato et al.

(10) Patent No.: US 6,480,726 B1
(45) Date of Patent: Nov. 12, 2002

(54) PORTABLE TELEPHONE DEVICE

(75) Inventors: Masaaki Sato, Kanagawa (JP); Makoto Mochizuki, Kanagawa (JP); Naokazu Nagasawa, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/691,378

(22) Filed: Oct. 18, 2000

(30) Foreign Application Priority Data

Oct. 19, 1999 (JP) .......................................... 11-297314

(51) Int. Cl.7 .............................. H04B 1/38; H04M 1/00
(52) U.S. Cl. ........................ 455/566; 455/575; 455/90; 455/550
(58) Field of Search ................................ 455/550, 567, 455/566, 575, 90, 412, 569; 340/815.4, 815.53, 815.54

(56) References Cited

U.S. PATENT DOCUMENTS

| | | | | |
|---|---|---|---|---|
| 5,752,203 A | * | 5/1998 | Yamashita | 455/575 |
| 5,943,627 A | * | 8/1999 | Kim | 455/569 |
| 6,029,063 A | * | 2/2000 | Parvulescu | 455/412 |
| 6,127,933 A | * | 10/2000 | Ohmura | 340/636 |

FOREIGN PATENT DOCUMENTS

| | | |
|---|---|---|
| JP | 8065367 A | 3/1996 |
| JP | 9027840 A | 1/1997 |

* cited by examiner

*Primary Examiner*—Vivian Chin
*Assistant Examiner*—John J Lee
(74) *Attorney, Agent, or Firm*—Pearne & Gordon LLP

(57) ABSTRACT

A portable telephone device can inform the surroundings unintentionally that a user is talking during speaking on the portable telephone. A speaking state display means 7 that goes on and off during speaking is provided on a back surface side of a body case 1 in relation to an operational surface side thereof and at a position where it is not covered with a hand when a user holds a portable telephone device. When it is detected that the portable telephone device enters on the speaking state, the speaking state display means 7 is turned on and off by a control means 10 at regular intervals while the brightness is being gently increased or gently decreased, whereby the speaking state display means is turned on and off just like a firefly. Further, the brightness is set to a low degree by which a person near the portable telephone device can identify the brightness, whereby the consuming electric power of a battery is suppressed low and a hindrance to the speaking time of the portable telephone is prevented.

3 Claims, 6 Drawing Sheets

PORTABLE TELEPHONE DEVICE

BACKGROUND OF THE INVENTION

The present invention relates to a portable telephone device, and particularly to a portable telephone device equipped with a speaking state display means in order to display a speaking state.

A conventional portable telephone device was not equipped with means which informs the surroundings unintentionally that a user is talking over the telephone. In case that the user wanted to inform the surroundings unintentionally that he was talking over the telephone, he has detached an antenna originally provided for the portable telephone device and exchanged it for an antenna of which a leading end blinks on and off.

It has been said that to use a portable telephone at a location where many persons collect, for example, in a train is against manners. However, in circles such as an association of like-minded persons, to speak on the portable telephone is permitted in case of necessity; and there is also manners in which the surrounding people who are talking are silent in consideration of a person who has started making a telephone call. In this case, it is convenient to have the surrounding people be silent by exhibiting that the user is taking over the telephone by some methods and having them be conscious of it.

Further, when the user receives a sound less call by vibrator at night, in case that he starts speaking suddenly, the surrounding people frequently look at him out of curiosity. Particularly, under condition where a small-sized portable telephone device hides itself in the palm of a hand or hair, in order to prevent him from seeming suspicious to them, there are some cases that he would like to show speaking on the portable telephone device to the surrounding people.

Under the above condition, a means which informs the surroundings unintentionally that the user is talking over the telephone is desired. As one method for resolution, there is a conventional method that an antenna is privately exchanged to lighten the leading end of the antenna. However, there were some cases that this method was not preferable for the user from viewpoints of cost, working and antenna sensitivity, and also from a view point that many antennas on the market are types in which blinking on/off is performed with high brightness and at a high speed.

As the operation during speaking on the telephone that the surrounding people would like to be able to confirm as described above, there is an operation of memo recording that memo-records the speaking contents. However, we are anxious in case that it cannot be confirmed from the outside that the memo recording function is normally operating even if a memo recording button is pushed on. The portable telephone device requires a new means that confirms the operation state during speaking on the telephone from the outside.

SUMMARY OF THE INVENTION

A first object of the invention is to provide a portable telephone device provided with a means which can inform the surroundings unintentionally that a user is talking over the telephone, which is a means other than a method that the antenna is privately exchanged to lighten a leading end of the antenna.

Further, a second object of the invention is to provide, in a portable telephone device having a function of memo-recording speaking contents during speaking on the telephone, a portable telephone device provided with a means that visually confirms that the memo-recording function is operating.

According to the first aspect of the invention, a speaking state display means that goes on and off during speaking on a telephone is provided for a body case of a portable telephone device, and the speaking state display means is turned on and off by a control means at regular intervals when the portable telephone device enters on the speaking state. Further, according to the second aspect of the invention, a speaking state display means that goes on and off during speaking is provided on a back surface of a body case of a portable telephone device and at a position where the speaking state display means cannot be covered with a hand when a user holds the portable telephone device; and the speaking state display means is turned on and off by a control means at regular intervals when the portable telephone device enters on the speaking state.

By these constitutions, the surroundings can be informed unintentionally that a user is talking during speaking over the telephone.

According to the third aspect of the invention, a memo recording switch that starts a function of memo-recording speaking contents is provided for a body case of a portable telephone device, and the memo recording switch is used as a switch with a light emitting means that goes on and off when the memo recording function is started.

By this constitution, a state during memo-recording operation can be confirmed from the outside by the light emitting means that goes on and off when the memo-recording operation is started.

According to the fourth aspect of the invention, one switch with a light emitting means is used both as a speaking state display means that goes on and off in a first color during speaking and a memo recording switch that goes on and off in a second color when a memo recording operation is started.

By this constitution, only by providing one switch with the light emitting means on a back surface of the body case, it can go on and off in the first color during speaking and go on and off in the second color during the memo recording operation. According to the fifth aspect of the invention, when the portable telephone device enters on the speaking state, the speaking state display means is turned on and off with brightness that a person near the portable telephone device can identify while the brightness is being gently increased at regular intervals or gently decreased, whereby the speaking state display means is turned on and off just like a firefly.

By this constitution, the surroundings can be informed unintentionally that the user is talking over the telephone in an going on/off mode that gives the settled feeling to a viewer, that is, in a mode in which light and darkness are slowly repeated with a brightness that only a person near the portable telephone can confirm, which is different from the going on/off mode in which going on and off are switched with high brightness and at a high speed like the conventional antenna of which the leading end is lightened.

DETAILED DESCRIPTION OF THE PREFERRED EMBODIMENTS

Modes for carrying out the invention will be described below with reference to FIGS. 1 to 6.

Figure 1A:
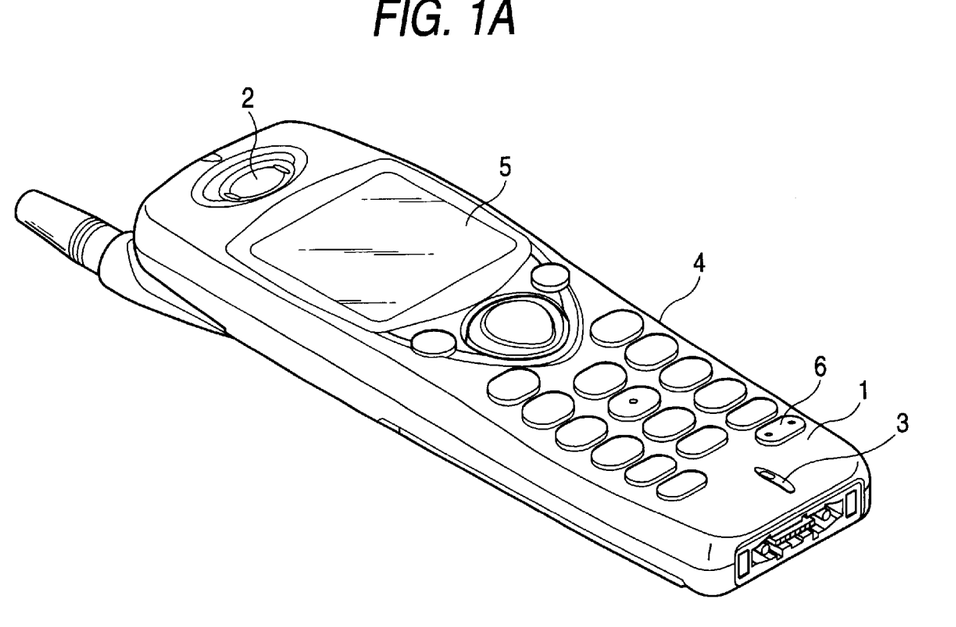
FIG. 1A is an exterior perspective view in which an operational surface of a portable telephone device according to a mode for carrying out the invention is shown upward.

FIG. 1A is an exterior perspective view in which an operational surface of a portable telephone device according to a mode for carrying out the invention is shown upward. In a body case 1, there are arranged a receiver 2, a transmitter 3, a key operational portion 4, and a display portion 5. Particularly, in the key operational portion 4, there is provided a memo recording button 6 functioning as a memo recording switch that starts recording the speaking contents by being pushed on during speaking on the telephone.

Figure 1B:
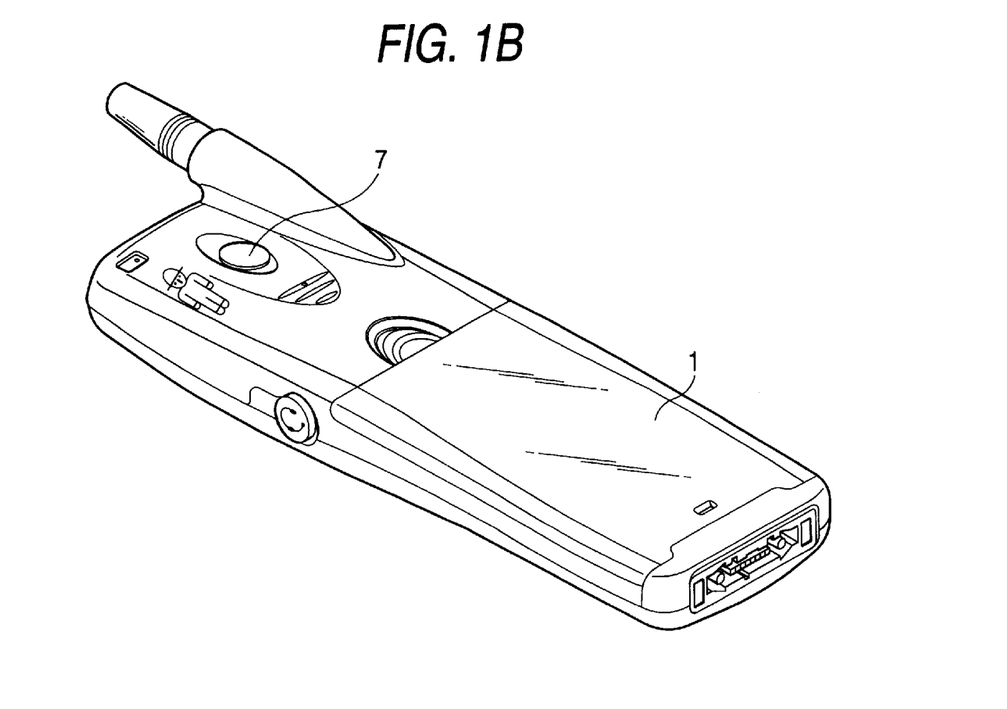
FIG. 1B is an exterior perspective view in which a back surface of the portable telephone device according to the mode for carrying out the invention is shown upward.

FIG. 1B is an exterior perspective view in which a back surface of the portable telephone device according to the mode for carrying out the invention is shown upward, in which a speaking state display portion 7 that goes on and off when the portable telephone enters on the speaking state is provided.

Figure 2:
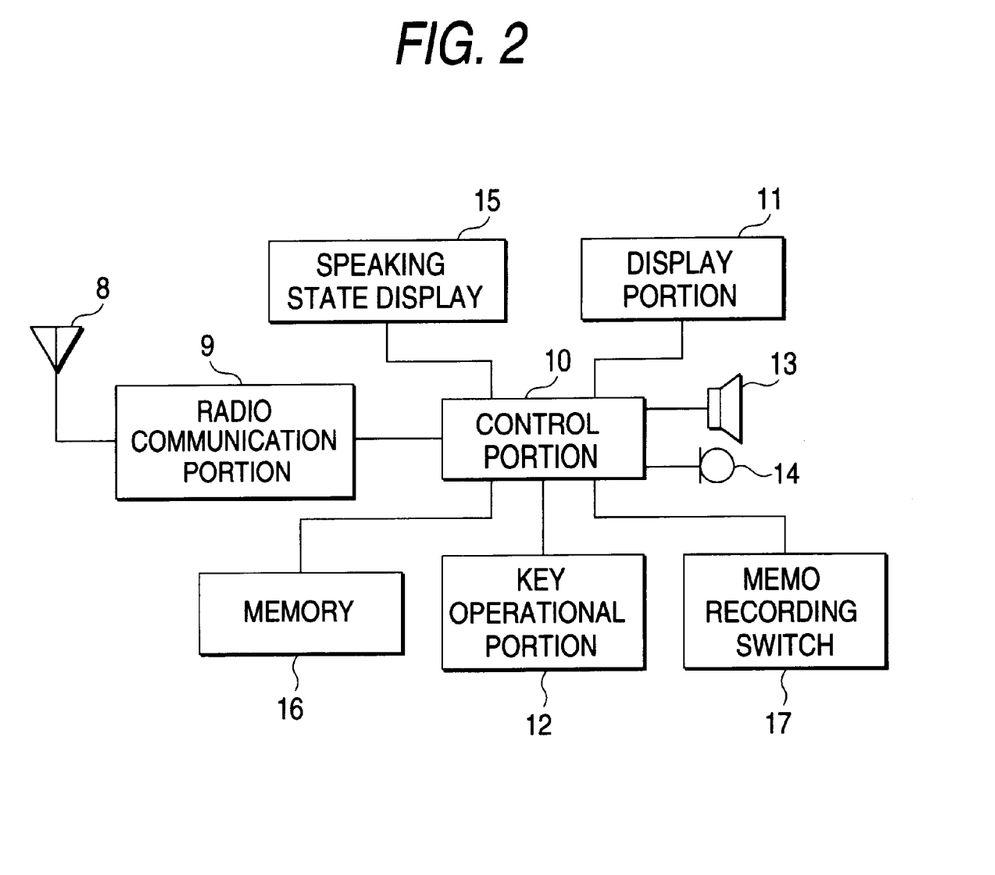
FIG. 2 is a function block diagram of the portable telephone device according to a first mode for carrying out the invention.

FIG. 2 is a function block diagram of the portable telephone device according to the mode for carrying out the invention. In FIG. 2, a radio wave received by an antenna 8 is received by a receiving portion (not shown) of a radio communication portion 9, and the reception data is transmitted to a control portion 10. The control portion 10 displays the reception data such as a telephone number that has been received in a display portion 11 such as a liquid crystal display. Further, the control portion 10 converts the reception data into audio data and speech-outputs the converted data through a speaker 13 of a receiver portion. Further, a transmitter portion (mike) 14 receives the voice of a user, transmits the audio data to the control portion 10, and audio-transmits the audio data through a transmitter portion (not shown) of the radio communication portion 9 and the antenna 8 to a person on the other end of the line. The control section 10 causes a memory 16 to record the audio data such as the speaking contents during speaking, or reads out the data recorded in the memory. A key operational portion 12 such as a ten key inputs signals to the control section 10 by key operation or causes the memory 16 to record private data in an electronic telephone directory through the control section 10. Further, a speaking state display 15 provided separately from the display portion 11, when the radio communication portion 9 starts the radio communication, is turned on and off by the control of the control portion 10 at regular intervals. Since the speaking state display 15 is provided on the back surface of the body case 1 and a position where it is not covered with a hand when the portable telephone is held as shown in FIG. 1B, it is possible to inform the surroundings that a user is talking during speaking on the portable telephone.

Figure 3A:
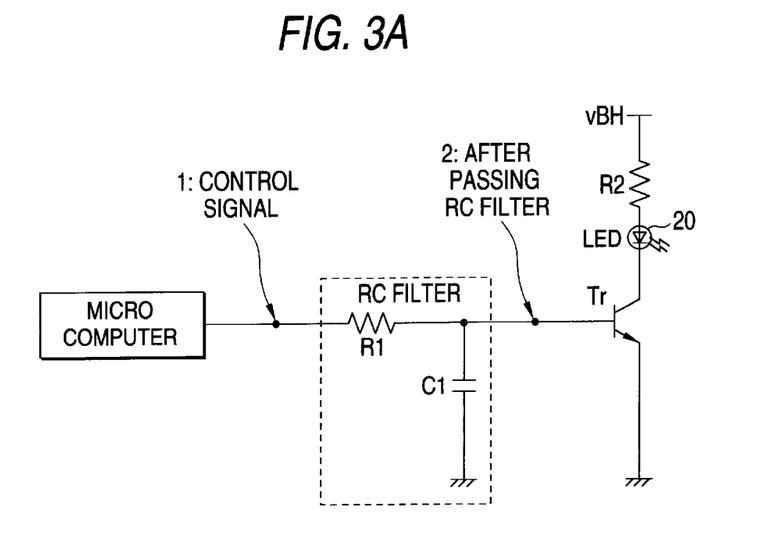
FIG. 3A is a circuit diagram for explaining going on/off operation of the portable telephone device according to the mode for carrying out the invention.
Figure 3B:
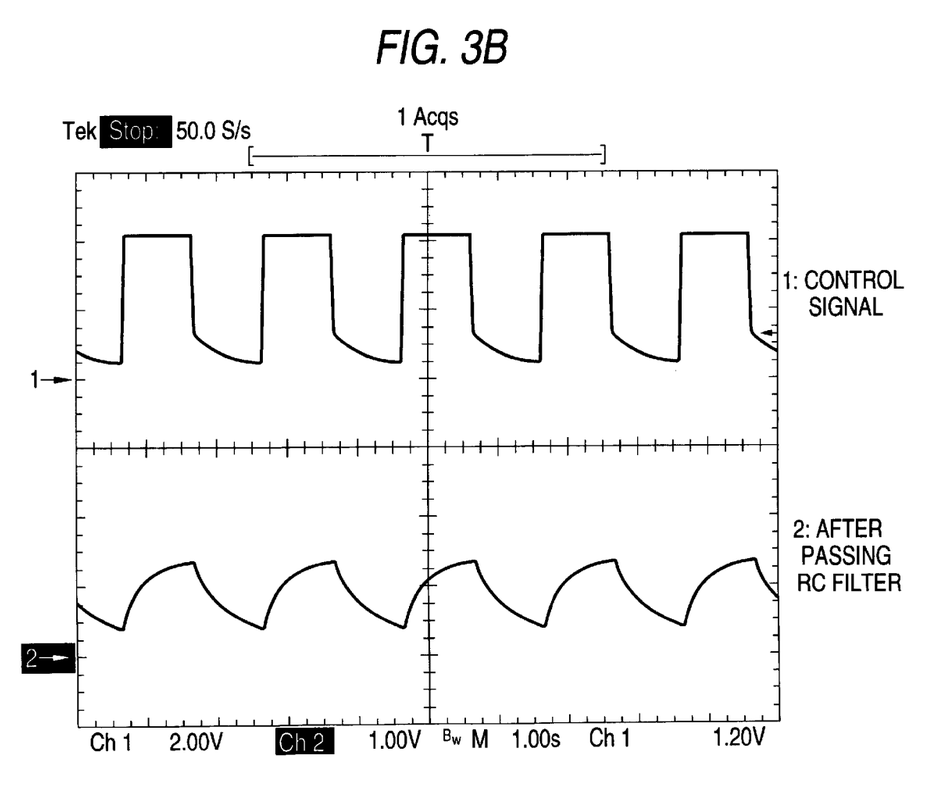
FIG. 3B is a waveform diagram for explaining going on/off operation of the portable telephone device according to the mode for carrying out the invention.

When the portable telephone enters on the speaking state, the control portion 10 turns on and off the speaking state display 15 by gently increasing and decreasing the brightness at the regular intervals. In order to turn on and off the speaking state display by gently increasing and decreasing the brightness, a square wave from the control portion 10 (control signal in FIG. 3) is converted by a RC filter into a gentle control signal (after passing the RC filter in FIG. 3). In FIG. 3, R1=100 kΩ, R2=120 Ω, and C1=10 μF.

Such going on/off mode that the speaking state display goes on and off while the brightness is gently increasing and decreasing makes a soft and quiet impression on a viewer as if a firefly glistens. Further, the brightness is previously set to a comparatively low degree with which a person near the portable telephone can identify the brightness, whereby the consuming electric power of a battery is suppressed low and hindrance is not given to a speaking time of the portable telephone. As described above, according to the invention, during speaking on the portable telephone, the user can inform the surroundings unintentionally that he is talking.

Further, according to this function of displaying the speaking state, when the person on the other end of the line becomes silent and there is not any sound, a speaker can visually confirm that he has cut the telephone or that he has been speaking yet by looking at the speaking state display portion 7.

Figure 4A:
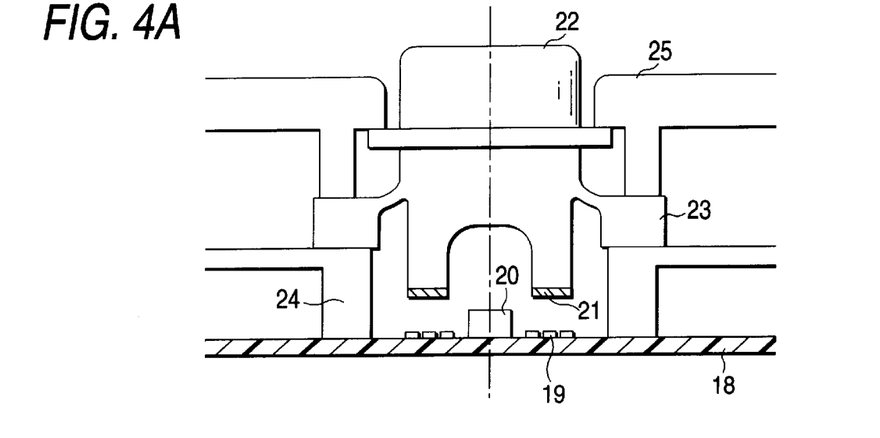
FIG. 4 is a sectional view showing the constitution near a memo recording button. according to the mode for carrying out the invention.

FIG. 4 is a sectional view showing a structure of the memo recording button 6. In a sectional view of FIG. 4A, two contact patterns 19 are spaced and printed on a print substrate 18. In the center of the two contact patterns 19, a LED 20 is arranged, and a key button 22 is shown. By a furcate leading end portion of the key button that has a conductive film 21, the contact pattern 19 is pushed on. When the key button 22 is pushed on from the upside, a connecting portion with a skirt portion 23 is transformed and descends downward, so that the conductive film 21 comes into contact with the contact pattern 19 of the print substrate 18. Then, the LED 20 is turned on and off by a going on/off circuit (not circuit), and the key button 22 is illuminated.

Figure 4B:
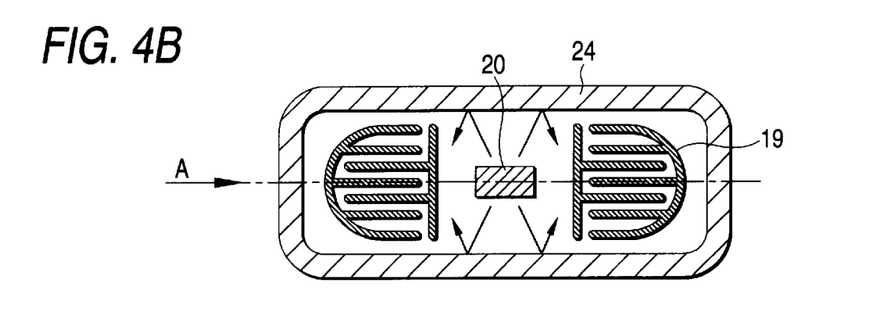
Figure 4C:
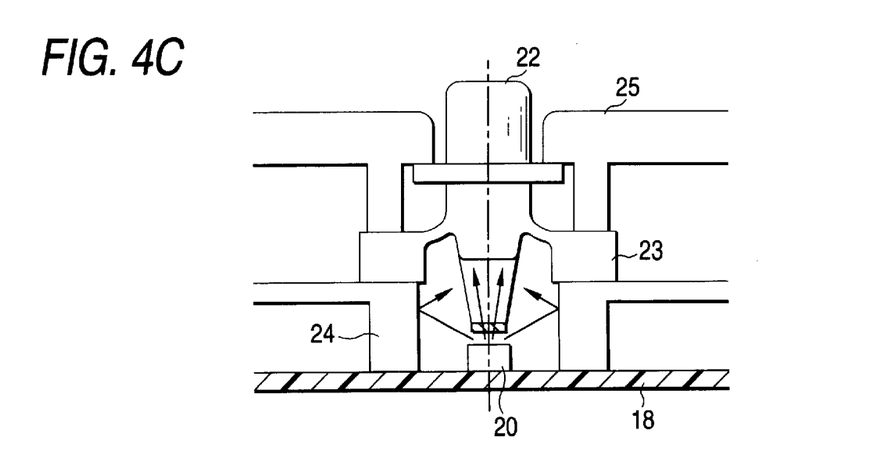

FIG. 4B is a plan view showing arrangements of the contact patterns 19 of the print substrate 18, the LED 20 and a rib 24 that surrounds them and reflects the light of the LED 20. FIG. 4C is a sectional view taken along a line shown by an arrow A, showing a state where the key button 22 rises by the force of the skirt portion 23 after the key button has been pushed on, and returns to the position where it comes into contact with a case 25, and the LED 20 that has started going on and off once is continually illuminating the key button 22.

By pushing on the key button 22, the control portion 10 starts the memo recording operation, records the speaking contents in the memory 16, and simultaneously, turns on and off the LED 20. Hereby, the speaker can confirm the memo recording operation by the going on/off of the LED 20 during speaking. The going on/off mode is shown in FIG. 3.

Figure 5:
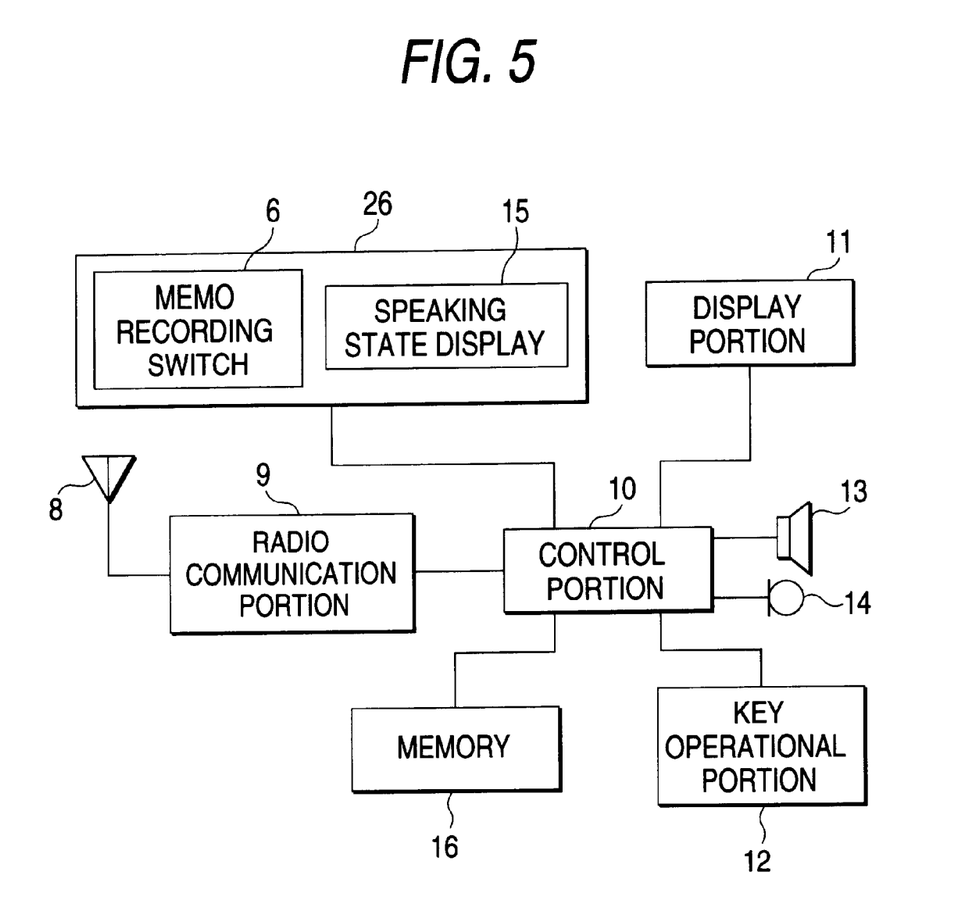
FIG. 5 is a function block diagram of a portable telephone device according to a second mode for carrying out the invention.

FIG. 5 is a constitutional block diagram in a second mode for carrying out the invention, in which a switch 26 with a light emitting means is used as both the speaking state display portion 7 and the memo recording button 6 that have been described in the first mode. To say concretely, the switch with the light emitting means 26 used as the memo recording button 6 is arranged at a position of the speaking state display portion 7 on the back surface of the body case in the first mode shown in FIG. 1B.

Figure 6:
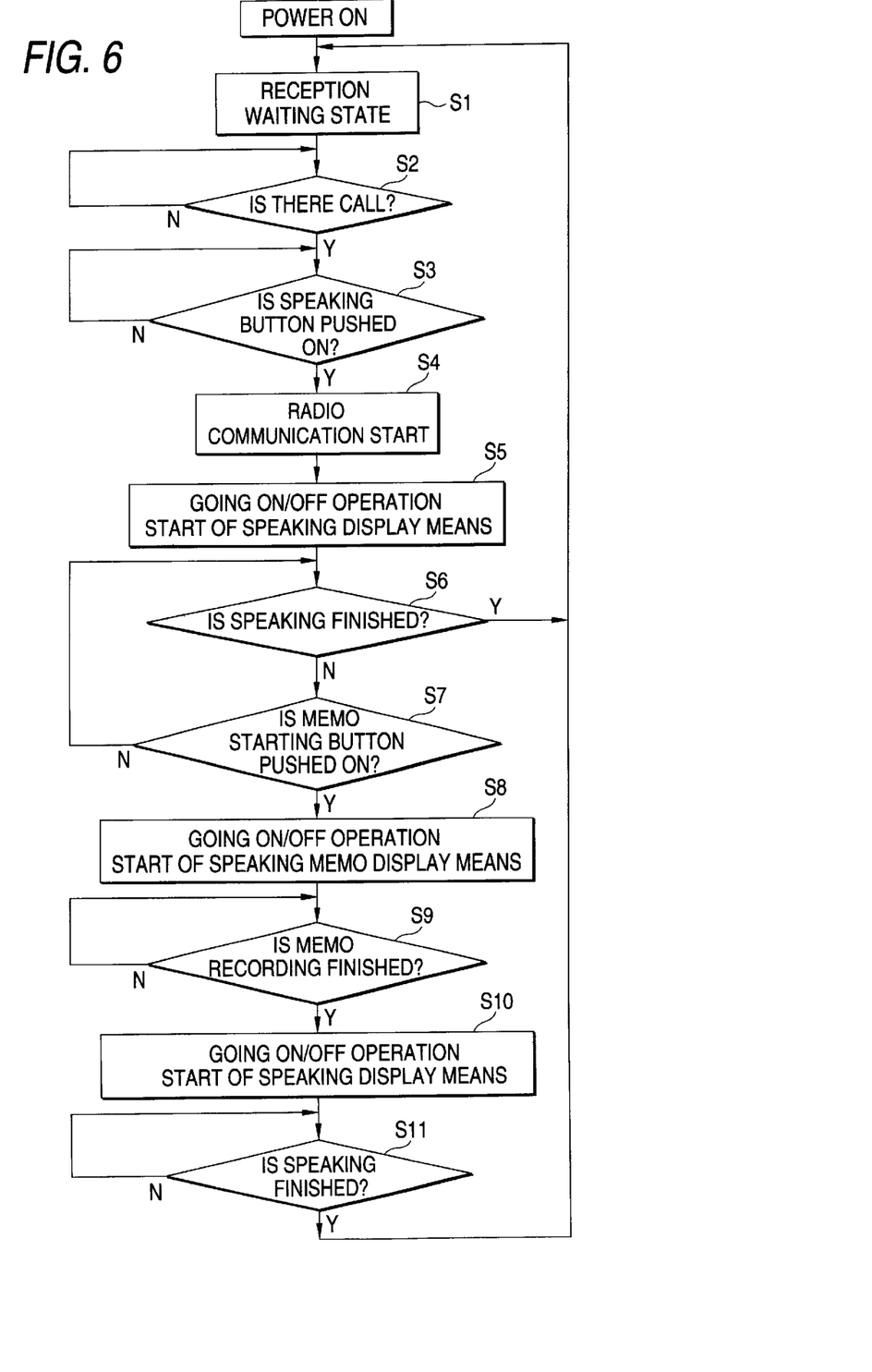
FIG. 6 is a flowchart for explaining operations during speaking in the portable telephone device according to the second mode for carrying out the invention.

FIG. 6 is a flowchart showing the speaking state display operation during speaking and an operation when the memo recording is performed on the way. First, when the power is switched on, the portable telephone device enters on a reception waiting state (step 1). In case that there is a call, the portable telephone rings (step 2). When the user pushes on a speaking button (step 3), radio communication is started (step 4).

The control portion 10, when the radio communication is started, turns on and off the speaking state display 15 in a first light emitting color, for example, blue (step 5). In case that the speaking is completed intactly, the procedure returns to the reception waiting state (step 6). When the memo recording button 6 which is a memo recording switch is pushed on during speaking (step 7), the LED 20 of the memo recording button 6 goes on and off in a second light emitting color, for example, red (step 8). Thereafter, when the memo recording is finished since the predetermined time has elapsed, or when the memo recording button 6 is again pushed on in a sense of the memo recording finish and the memo recording is finished (step 9), the LED 20 goes on and off as the speaking state display 15 in blue of the first light emitting color (step 10). Thereafter, when speaking is finished, the procedure returns to the reception waiting state (step 11).

By performing the above operations, it is possible to inform the surroundings unintentionally that a user is talking during speaking on the portable telephone through the going on/off state of the speaking state display 15 provided on the back surface of the body case. Further, the speaking state display functions also as the memo recording switch, whereby it is used as the means for displaying the memo recording operation during speaking, so that the user can confirm the memo recording operation during speaking.

As described in the first mode for carrying out the invention, the speaking state display portion goes on and off, for example, in blue during speaking on the portable telephone, whereby it is possible to inform the surroundings unintentionally that the user is speaking on the telephone. Further, as described in the second mode for carrying out the invention, when the speaking button is pushed on during speaking, the speaking state display portion goes on and off in red, whereby it is known that the portable telephone is during the operation of the speaking memo. Since the operational surface of the telephone comes into tight contact with his surface particularly during speaking, he cannot look at the liquid crystal display portion. However, since he know that the speaking state display portion goes on and off, for example, in blue during speaking and that it goes on and off in red during the memo recording operation, he can confirm that the portable telephone is in the speaking mode or the speaking memo mode by reflecting himself who is speaking on the telephone in a mirror or a glass of a show window on a street to see the going on/off state by necessity. Though it is inconvenient for the user to see the going on/off state indirectly, since he could not confirm the going on/off state conventionally during speaking, a newest effect can be obtained.

Further, as shown in FIG. 1B, if an illustration similar to that of a person who lowers his head together with characters that I am sorry to be such a nuisance to you due to noisy is made on one side of the speaking state display portion 7, even when the user is compelled to speak on the portable telephone in a train, he can express a feeling of apology with the going on/off of the speaking state display portion 7 in relation to the surrounding people. Therefore, there is such an effect on use that a mental load on the speaker at the time of speaking there can be reduced.

As described above, according to the first aspect of the invention, the speaking state display means that goes on and off during speaking is provided for the body case of the portable telephone device; and the speaking state display means is turned on and off by the control means at regular intervals when the portable telephone device enters on the speaking state. Hereby, there is an effect that the surroundings can be informed unintentionally during speaking that the user is talking over the telephone.

According to the second aspect of the invention, the speaking state display means that goes on and off during speaking is provided on the back surface of the body case of the portable telephone device and at the position where the speaking state display means cannot be covered with a hand when a user holds the portable telephone device; and the speaking state display means is turned on and of f by the control means at regular intervals when the portable telephone device enters on the speaking state. Hereby, there is an effect that the surroundings can be informed unintentionally during speaking that the user is talking over the telephone.

Further, according to the third aspect of the invention, the memo recording switch that starts the function of memo-recording the speaking contents is provided for the body case of the portable telephone device, and the memo recording switch is used as the switch with the light emitting means that goes on and off when the memo recording function is started. Hereby, there is an effect that the state during the memo-recording operation can be confirmed from the outside by the light emitting means that goes on and off when the memo-recording operation is started.

Further, according to the fourth aspect of the invention, one switch with the light emitting means is used both as the speaking state display means that goes on and off in the first color during speaking and the memo recording switch that goes on and off in the second color when the memo recording operation is started. Hereby, there is an effect that only by providing one switch with the light emitting means on the back surface of the body case, it can go on and off in the first color during speaking and go on and off in the second color during the memo recording operation.

According to the fifth aspect of the invention, when the portable telephone device enters on the speaking state, the speaking state display means is turned on and off with brightness that a person near the portable telephone device can identify while the brightness is being gently increased at regular intervals or gently decreased, whereby the speaking state display means is turned on and off just like a firefly. Hereby, there is an effect that the surroundings can be informed unintentionally that a user is talking over the telephone in a mode that gives the settled feeling to a viewer, that is, in a mode in which light and darkness are slowly repeated with such a brightness that only a person near the portable telephone can confirm, which is different from the mode in which going on and off are switched with high brightness and at a high speed like the conventional antenna of which the leading end is lightened.

What is claimed is:

1. A portable telephone device comprising:
   a body case;
   speaking state display means provided with said body case, that blinks on and off during speaking is provided for a body case thereof; and control means that turns on and off said speaking state display means at regular intervals when the portable telephone device enters on the speaking state;

wherein when the portable telephone device enters on the speaking state, said speaking state display means is turned on and off with brightness that a person near the portable telephone device can identify while the brightness is being gently increased at regular intervals or gently decreased, whereby said speaking state display means is turned on and off just like a firefly.

2. A portable telephone device comprising:

a body case;

speaking state display means provided with said body case, that blinks on and off during speaking is provided for a body case thereof; and control means that turns on and off said speaking state display means at regular intervals when the portable telephone device enters on the speaking state;

wherein said speaking state display means is provided on a back surface of a body case and at a position where the speaking state display means cannot be covered with a hand when a user holds the portable telephone device, and when the portable telephone device enters on the speaking state said speaking state display means is turned on and off with brightness that a person near the portable telephone device can identify while the brightness is being gently increased at regular intervals or gently decreased, whereby said speaking state display means is turned on and off just like a firefly.

3. A portable telephone device comprising:

one switch with light emitting means used both as speaking state display means that blinks on and off in a first color during speaking and a memo recording switch that blinks on and off in a second color when a memo recording function is started;

wherein when the portable telephone device enters on the speaking state display means is turned on and off with brightness that a person near the portable telephone can identify while the brightness is being gently increased at regular intervals or gently decreased, whereby said speaking state display means is turned on and off just like a firefly.

* * * * *